(12) United States Patent
Ghosh et al.

(10) Patent No.: US 10,356,222 B2
(45) Date of Patent: Jul. 16, 2019

(54) REUSABLE MESSAGE FLOW BETWEEN APPLICATIONS OF A MESSAGE BROKER INTEGRATED SYSTEMS ENVIRONMENT

(71) Applicant: International Business Machines Corporation, Armonk, NY (US)

(72) Inventors: Rahul Ghosh, Kolkata (IN); Shouvik Mitra, Kolkata (IN); Aaron J. Quirk, Cary, NC (US); Stuart J. Reece, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/672,842

(22) Filed: Mar. 30, 2015

(65) Prior Publication Data
US 2016/0294969 A1    Oct. 6, 2016

(51) Int. Cl.
*G06F 9/46*    (2006.01)
*H04L 12/58*    (2006.01)
*H04L 29/06*    (2006.01)

(52) U.S. Cl.
CPC .............. *H04L 69/08* (2013.01); *G06F 9/46* (2013.01); *H04L 51/066* (2013.01)

(58) Field of Classification Search
CPC . H04N 1/00217; H04L 67/02; H04L 67/2823; H04L 29/06; H04L 67/04; H04L 69/08
See application file for complete search history.

(56) References Cited

U.S. PATENT DOCUMENTS

| | | | |
|---|---|---|---|
| 8,549,539 B2 * | 10/2013 | Furneaux | G06F 9/546 719/313 |
| 8,914,461 B2 * | 12/2014 | Murai | G06F 17/24 709/201 |

(Continued)

OTHER PUBLICATIONS

IBM, "IBM Integration Bus Version 9.0," IBM Corporation, Last updated: Mar. 17, 2015, p. 1-35, Relevant Sections: Connecting client applications by using service discovery: Database Service and MQ Service; Configurable services properties: EmailServer configurable service, FtpServer configurable service, JDBCProviders configurable service, and SAPConnection configurable service, http://www-01.ibm.com/support/knowledgecenter/SSMKHH_9.0.0/com.ibm.etools.msgbroker.helphome.doc/help_home_msgbroker.htm, Accessed on: Mar. 26, 2015.

(Continued)

*Primary Examiner* — Scott B Christensen
(74) *Attorney, Agent, or Firm* — Robert C. Bunker (57) ABSTRACT

A computer-implemented method for deploying a plurality of data conversion flow between a first application in a first system to a second application in a second system, without restarting the plurality of data conversation flow, is provided. The computer-implemented method may further include providing a plurality of modifiable data conversation that identifies a plurality of input parameters, a plurality of data formats, a plurality of data description, a plurality of conversation routines, a plurality of paths of the conversion routines, and a plurality of output information that determines routes of converted data for the first application. The computer-implemented method may further include converting the plurality of modifiable data conversion to form a data input from the first application to the second application. The computer-implemented method may further include providing an application interface for transmitting (Continued)

the plurality of modifiable data to the second application, without restarting the data conversion flow.

8 Claims, 7 Drawing Sheets

(56) References Cited

U.S. PATENT DOCUMENTS

| | | | | |
|---|---|---|---|---|
| 8,930,226 | B1* | 1/2015 | Kerr | G06Q 50/24 |
| | | | | 705/3 |
| 2002/0004815 | A1* | 1/2002 | Muhlestein | G06F 9/46 |
| | | | | 709/201 |
| 2005/0005022 | A1* | 1/2005 | Taylor | H04L 29/06 |
| | | | | 709/236 |
| 2007/0067471 | A1* | 3/2007 | Wolfe | H04L 67/02 |
| | | | | 709/230 |
| 2009/0089797 | A1* | 4/2009 | Kukreja | G06F 8/30 |
| | | | | 719/314 |
| 2009/0207750 | A1* | 8/2009 | Robinson | H04L 43/18 |
| | | | | 370/252 |
| 2012/0110077 | A1* | 5/2012 | Merchant | H04L 51/066 |
| | | | | 709/204 |
| 2012/0151498 | A1* | 6/2012 | Furneaux | G06F 9/546 |
| | | | | 719/314 |
| 2012/0239824 | A1* | 9/2012 | Nguyen | G06F 15/16 |
| | | | | 709/246 |

OTHER PUBLICATIONS

Mell et al., "The NIST Definition of Cloud Computing," National Institute of Standards and Technology, Information Technology Laboratory, Oct. 7, 2009, Version 15.

* cited by examiner

REUSABLE MESSAGE FLOW BETWEEN APPLICATIONS OF A MESSAGE BROKER INTEGRATED SYSTEMS ENVIRONMENT

BACKGROUND

The present invention relates generally to the field of software system application, and more particularly to modification and deployment of data conversion flow, between systems applications, without restarting the data conversation message flow, of the system applications.

Enterprise systems are large-scale application software packages that support business processes, information flows, and maintenance data of organizations. Though enterprise systems are typically packaged enterprise application software (PEAS) systems, they can also be bespoke, custom developed systems, created to support a specific organization's needs. A message broker may be required for integrating multiple applications in enterprises systems that require multiple applications to interact with each other for data transfer. The message broker may also act as a tool for interacting with different systems, or applications, of the enterprises systems, for managing data of the enterprise systems. The message broker can also be required to transform data of applications, in extensible markup language (XML), Java Script Object Name (JSON), or other systems applications of the enterprise systems.

SUMMARY

According to an embodiment, a computer-implemented method for modifying and deploying a plurality of data conversion flow between a first application of a first system and a second application of a second system by dynamically loading user modifiable data conversion description to the data conversion flow, without restarting the data conversation flow, is provided. The computer-implemented method includes providing a plurality of modifiable data conversation that identifies a plurality of input parameters, a plurality of data formats, a plurality of data description, a plurality of conversation routines, a plurality of paths of the conversion routines, and a plurality of output information that determines routes of converted data for the first application. The computer-implemented method further includes converting the plurality of modifiable data conversion to form a data input from the first application to the second application. The computer-implemented method further includes providing an application interface for transmitting the plurality of modifiable data to the second application, without restarting the data conversion flow.

According to another embodiment, a computer system is provided for modifying and deploying data conversion flow between a first application of a first system and a second application of a second system, without restarting the data conversation flow. The computer system includes one or more processors, one or more computer-readable memories, one or more computer-readable tangible storage devices, and program instructions stored on at least one of the one or more storage devices for execution by at least one of the one or more processors via at least one of the one or more memories. The computer system further includes program instructions to provide a plurality of modifiable data conversation that identifies a plurality of input parameters, a plurality of data formats, a plurality of data description, a plurality of conversation routines, a plurality of paths of the conversion routines, and a plurality of output information that determines routes of converted data for the first application. The computer system further includes program instructions to provide an application interface for transmitting the plurality of modifiable data to the second application, without restarting the data conversion flow.

According to yet another embodiment, a computer program product for modifying and deploying data conversion flow between a first application of a first system and a second application of a second system, without restarting the data conversation flow. The computer program comprises one or more computer-readable tangible storage devices and program instructions stored on at least one of the one or more storage devices. The computer program further comprises program instructions to provide a plurality of modifiable data conversation that identifies a plurality of input parameters, a plurality of data formats, a plurality of data description, a plurality of conversation routines, a plurality of paths of the conversion routines, and a plurality of output information that determines routes of converted data for the first application. The computer program further comprises program instructions to provide an application interface for transmitting the plurality of modifiable data to the second application, without restarting the data conversion flow.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relates generally to the field of software system application, and more particularly to modification and deployment of data conversion flow, of enterprise system application, such as, a first application of a first system to a second application of a second system by dynamically loading user modifiable data conversion description, using an application program interface (API), between the first system and the second system. The following described exemplary embodiments provide a system, method and program product for loading the user modifiable data description file, such as, extensible markup language (XML), American standard code for information interchange (ASCII), or HyperText Markup Language (HTML), using the API, from the first application of the first system to the second application of the second system. The present invention provides a system platform for configuring the user modifiable data conversion description, comprising input parameters, data formats, data description, conversion routines, paths to the conversion routines, and out information identifying a routing of converted data for the first application. Therefore, the present embodiment has the capacity to improve the technical field of reusable data conversation message flow between systems applications, such as, enterprise systems, or large-scale application software packages that support business processes, information flows, reporting, or maintenance of data of organizations, entities, or companies.

As previously described, with respect to reusable data conversation message flow between systems applications, a message broker may act as a tool for interacting with different systems, or applications for managing data. The message broker is an architectural pattern for message validation, message transformation, and message routing, for data transfer of systems applications, such as, enterprise system applications. When the message broker interacts with the different enterprise systems for data transmission, a message flow program may be required to control flow of message from one enterprise system to another enterprise system, such as, for instance, control of message flow, by the message program, between a source system and a target system. The message flow program may also be organized with a sequence of nodes which are designed to perform data management within an enterprise environment, thus, providing a platform for management of data transfer and, system integration, of applications between different enterprise systems, such as, the source system and the target system.

However, during data transfer, or system integration between the enterprise systems, it is often required to maintain system design parameters of the enterprise systems. The design parameters can include, for example, database name, or data source name of source database of the source system, or a target database of the target system, or internet protocol (IP) address of the enterprise systems. One way of maintaining design parameters of the enterprise systems during performance of data management may include configuration of the design parameters in the message flow, based on user defined coded or programmed values, in the message flow program, for maintaining the design parameters.

One reason for maintaining design parameters of the enterprise systems during performance of data management may be because any change to the design parameters of the enterprise systems will require a change or redeployment of programming properties of the message flow program. For example, once the message flow program is changed or redeployed, due to a change in the design parameters, properties of the message broker must also be changed to reflect a redeployment of the message flow program.

However, in a robust integration solution where the number of interfaces and design parameters of the message flow program are considerably large, such redeployment or change of programming properties of the message flow program can have has several drawbacks: first, any change of the design parameters of the message flow program would call for a significant knowledge on integration tools of the enterprises systems or the message broker; or, second, if the programming properties of the message flow program are changed or redeployed, such redeployment of the programming properties of the message flow program must be redeployed in the message broker, thus, leading to application downtime of the enterprise system. As such, it may be advantages, among other things, to provide a system to address maintenance of design parameters of the enterprise systems, without changing or redeploying programming properties of the message flow program, during performance of data management between the enterprise systems.

According to at least one implementation, the present invention provides an enterprise system environment for changing a data conversion flow between a first application in a first system to a second application in a second system without restarting the data conversion flow. More specifically, the present invention provides a user modifiable data conversion description identifying input parameters, data formats, data description, conversion routines, paths to the conversion routines, and output information identifying a routing of converted data for a first application in a first system, whereby the data of the first application is converted form input to a second application in a second system used for a data conversion flow. The present invention also provides an application programming interface (API) for dynamically loading the user modifiable data conversion description without restarting the data conversion flow and, whereby the first application has a data format different from the second application requiring a transformation, according to embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
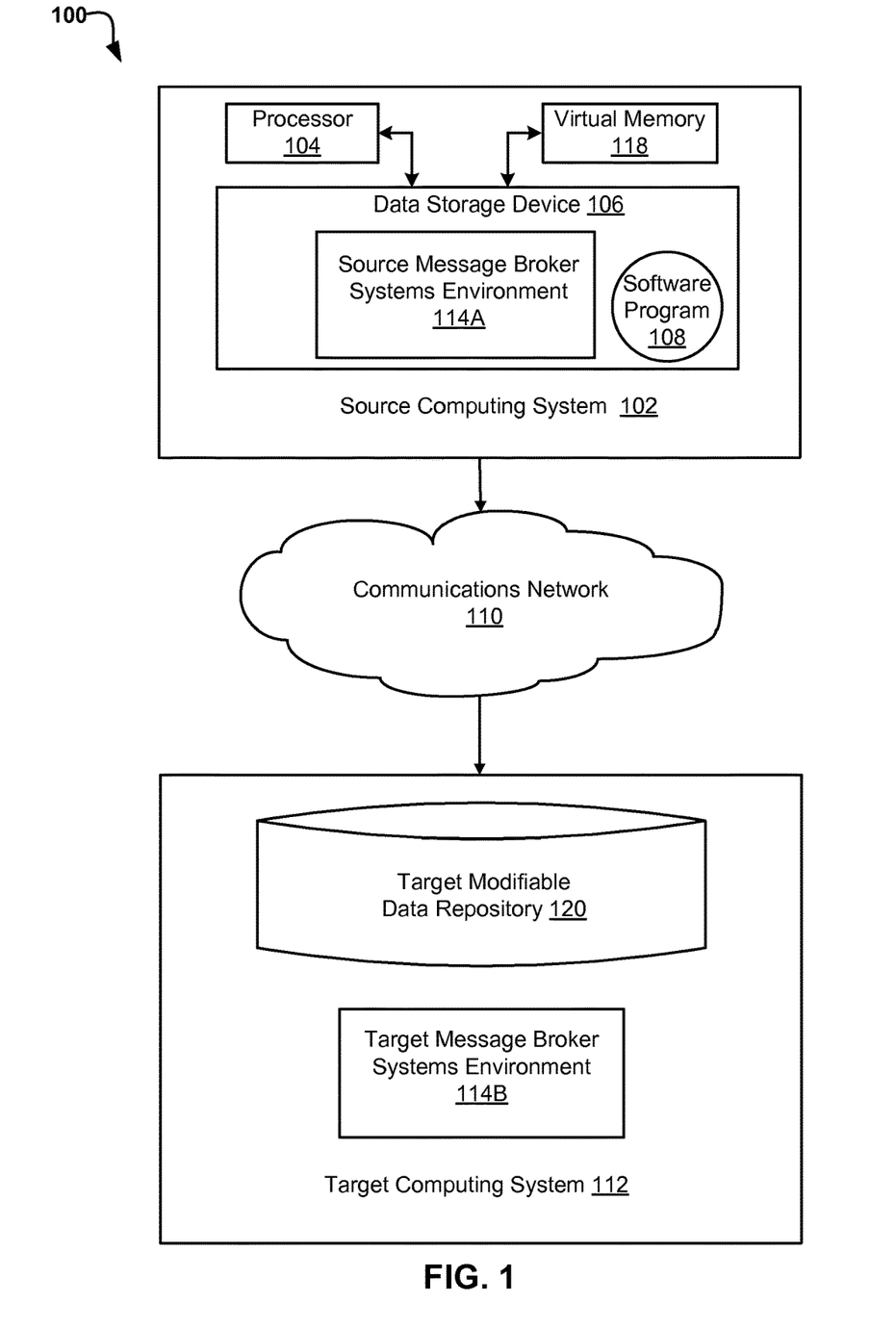
FIG. 1 illustrates a networked computer environment according to one embodiment.

Referring now to FIG. 1, an exemplary networked integrated data conversion environment 100 for modifying and deploying data conversion flow between a first application of a first system and a second application of a second system and, dynamically loading user modifiable data conversion description to the data conversion flow, without restarting the data conversation flow, within the integrated data conversion environment 100, is depicted. The integrated data conversion environment 100, may include a source computing system 102 with a processor 104 and a data storage device 106 that is enabled to run, or execute program instructions of a software program 108. The source computing system 102 may also include a source message broker systems environment 114A, for managing an application program interface, for initiating integration of multiple systems application solutions between a plurality of systems, whereby, multiple systems application solutions of the plurality of systems interact for performing data transfer within integrated data conversion environment 100.

For example, the integrated data conversion environment 100 may also include a target computing system 112, running a target message broker systems environment 114B, and interconnected with source computing system 102, over communication network 110, for performing data transfer between source computing system 102 and target computing system 112. For example, both the source message broker systems environment 114A and the target message broker systems environment 114B are architectural patterns for message validation, message transformation and, message routing, between the source computing system 102 and the target computing system 112. The integrated data conversion environment 100 may also include a plurality of source computing systems 102 and target computing systems 112, only two of which are shown, at least in FIG. 1. The communication network 110 includes one or more networks of any kind that can provide communication links between various devices and computers connected together within the integrated data conversion environment 100.

The communication network 110 may also include connections, such as wired communication links, wireless communication links, or fiber optic cables. The communication network 110 can also be implemented as a number of different types of networks, including, for example, a local area network (LAN), wide area network (WAN) or a packet switched telephone network (PSTN), or some other networked system. For example, the integrated data conversion environment 100 can utilize the Internet with network 110 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

It should be appreciated that FIG. 1 provides only an illustration of one implementation and does not imply any limitations with regard to the environments in which different embodiments may be implemented.

Many modifications to the depicted environments may be made based on design and implementation requirements. The source message broker systems environment 114A may communicate with the target message broker systems environment 114B, running on target computing system 112, via the communication network 110, for executing a systems platform for modifying and deploying data conversion flow between the source message broker systems environment 114A and target message broker systems environment 114B and, dynamically loading user modifiable data conversion description to a data conversion flow in target message broker systems environment 114B, without restarting the data conversion flow, according to embodiments, all within integrated data conversion environment 100.

The source computing system 102 can be, for example, a mainframe server computer system, such as, a management server, a web server, or any other electronic device or computing system capable of transmitting data, between source computing system 102 and target computing system 112, for executing a systems platform for modifying and deploying data conversion flow between the source message broker systems environment 114A and target message broker systems environment 114B. The source computing system 102 can also represent a "cloud" of computers interconnected by one or more networks, whereby, the source computing system 102 is a primary server of a plurality of server computing systems that utilizes clustered computers, when accessed through the communication network 110.

For example, a cloud computing system can be an implementation of automatic deployment of integrated system application tests cases, within the integrated data conversion environment 100, according to embodiments. The source computing system 102 may also be, for example, a laptop, tablet, or notebook personal computer (PC), a desktop computer, a mainframe or mini-computer, or a personal digital assistant (PDA).

The source computing system 102 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for executing a systems platform for modifying and deploying data conversion flow between the source message broker systems environment 114A and target message broker systems environment 114B.

The database storage device 106, of source computing system 102, is any type of storage device, storage server, storage area network, redundant array of independent discs (RAID), cloud storage service, or any type of data storage. The database storage device 106 can also be a relational model database server for storing program instructions for displaying information pertaining to transmitting data, between source computing system 102 and target computing system 112, for executing a systems platform for modifying and deploying data conversion flow between the source message broker systems environment 114A and target message broker systems environment 114B.

The target computing system 112 can be, for example, a mainframe server computer system such as a management server, a web server, or any other electronic device or computing system capable of transmitting data, between source computing system 102 and target computing system 112, for executing a systems platform for modifying and deploying data conversion flow between the source message broker systems environment 114A and target message broker systems environment 114B.

The target computing system 112 can also represent a "cloud" of computers interconnected by one or more networks, whereby, the target computing system 112 is a primary server of a plurality of server computing systems that utilizes clustered computers, when accessed through the communication network 110. The target computing system 112 may also be, for example, a laptop, tablet, or notebook personal computer (PC), a desktop computer, a mainframe or mini-computer, or a personal digital assistant (PDA), or any type of computing devices capable of accessing a network for executing a systems platform for modifying and deploying data conversion flow between the source message broker systems environment 114A and target message broker systems environment 114B.

The target modifiable data repository 120 is any type of storage device, storage server, storage area network, redundant array of independent discs (RAID), cloud storage service, or any type of data storage for storing information relating to modifiable data conversion description files, for modifying and deploying data conversion flow between the source message broker systems environment 114A and target message broker systems environment 114B and dynamically loading user modifiable data conversion description to a data conversion flow in target message broker systems environment 114B, without restarting the data conversation flow.

Figure 2:
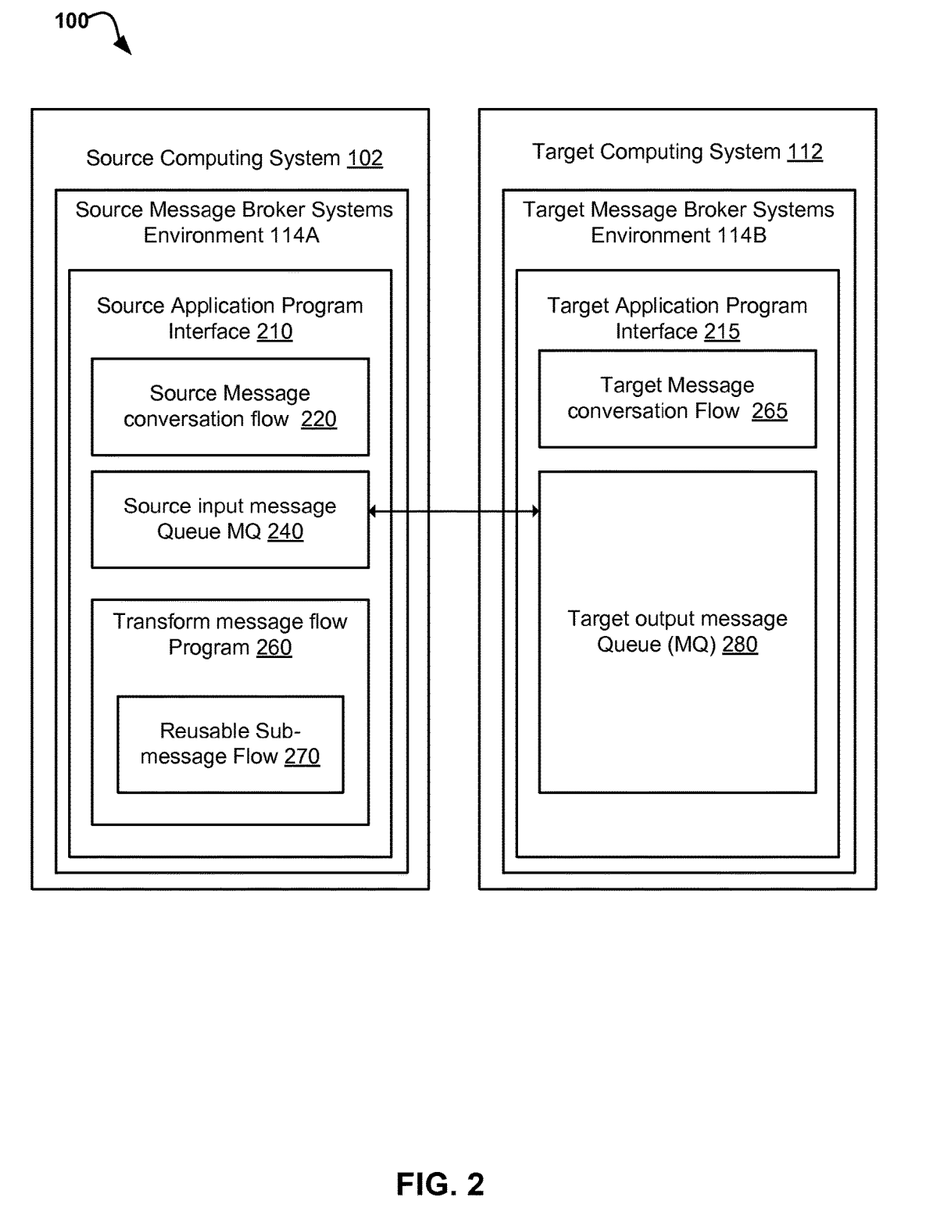
FIG. 2 illustrated a networked computing environment for program for modifying and deploying data conversion flow between a source system and a target system according to at least one embodiment.

FIG. 2 illustrates a functional block diagram of program components of the integrated data conversion environment 100 (FIG. 1), for modifying and deploying data conversion flow between source computing system 102 (FIG. 1) and target computing system 112 (FIG. 1) and dynamically loading user modifiable data conversion description to the data conversion flow, without restarting the data conversation flow, according to embodiments.

It should be appreciated that FIG. 2 provides only an illustration of one implementation and does not imply any limitations with regard to the environments in which different embodiments may be implemented. Many modifications to the depicted environment of FIG. 2 may be made based on design and implementation requirements.

In the depicted environment, the source message broker systems environment 114A (FIG. 1) includes source application program interface (API) 210. The source API 210 is a graphical user interface that provides a system platform for determining conversion routes, system interaction of transmission of program components between the source computing system 102 (FIG. 1) and the target computing system 112 (FIG. 1). For example, the API 210 includes sets of routine, protocols, and tools for invoking a source message flow, for loading user modifiable data description files, such as, extendable markup language (XML), or Hypertext Markup Language (HTML), and, for dynamically transmitting a message conversation flow comprising input parameters, data formats, data description, conversion routines, or paths to the conversion routines, and transmitting the message conversion flow to the target computing system, without restarting the data conversion flow.

According to embodiments, the source message conversation flow 220 is dynamically received in a source input message queue (MQ) 240, for interacting with different systems, or applications, of the integrated data conversion environment 100 (FIG. 1). The source message conversion flow 220 is received by the source input message queue 240, periodically, randomly, and/or using event-based transmission, by the source message broker systems environment 114A (FIG. 1), for dynamically loading user modifiable data conversion description between the source computing system 102 (FIG. 1), and the target computing system 112 (FIG. 1), without restarting the data conversation flow. According to embodiments, a transform message flow program 260 is triggered for verifying routes of the parameters of the source message conversation flow 220, once the source message conversation flow 220 is received in the source input MQ 240. The transform message flow program 260 includes node flow order verification mechanisms for maintaining design order of the design parameters of the source message conversation flow 220. The transform message flow program 260 includes a reusable sub-message flow 270, which is invoked by the transform message flow program 260, for loading design parameters, maintained in an XML file of the source message conversation flow 220.

For example, the design parameters of the source message conversation flow 220 may include data formats, data description, conversion routines, paths of the conversion routines, and output information for identifying a routing of converted data of the source message conversation flow 220, to the target message broker systems environment 114B (FIG. 1), whereby the converted data is dynamically modified to form an input target message conversation flow 265 to target output message queue 280 via a target application program interface 215 of the target message broker systems environment 114B (FIG. 1). Further, once the design parameters are loaded, the control or flow of the source message conversation flow 220 is dynamically transmitted to an output message queue (MQ) via the target message broker systems environment 114B (FIG. 1), without modifying or changing the design parameters of the source message conversation flow 220, according to embodiments.

Figure 3:
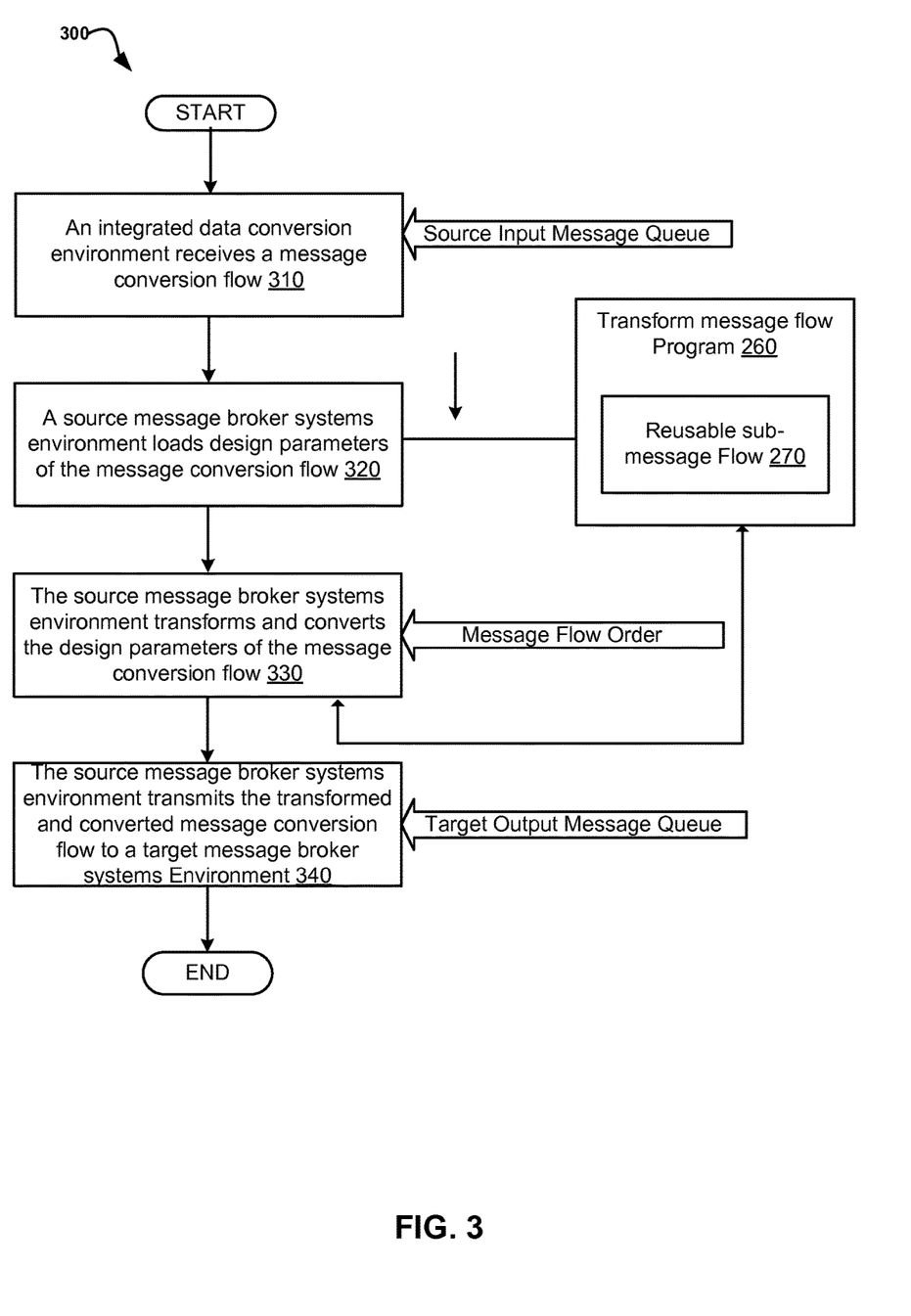
FIG. 3 illustrates an operational flowchart illustrating the steps carried out by a program for modifying and deploying data conversion flow between a source system and a target system according to at least one embodiment.

FIG. 3 illustrates a flow diagram 300 for modifying and deploying data conversion flow between the source computing system 102 (FIG. 1) and the target computing system 112 (FIG. 1), whereby, the transform message flow program 260 (FIG. 2) invokes reusable sub-message flow 270 (FIG. 2), for loading design parameters between the source message broker systems environment 114A (FIG. 1) and the target message broker systems environment 114B (FIG. 1), according to embodiments.

At step 310, the source message conversation flow 220 (FIG. 2) is dynamically received via the source input MQ 240 (FIG. 2) of the integrated data conversion environment 100 (FIG. 1). At step 320, the source message broker systems environment 114A (FIG. 1) loads design parameters of the message conversion flow to the transform message program 260 (FIG. 2), whereby the reusable sub-message flow 270 (FIG. 2) is invoked by the transform message flow 260 (FIG. 2), for loading design parameters of the source message conversation flow 220 (FIG. 2) to target message broker systems environment 114B (FIG. 1).

For example, according to embodiments, the design parameters are loaded within the source message broker environment 114A (FIG. 1) by a message flow order mechanism, whereby the transform message flow 260 (FIG. 2) is triggered for verifying routes of the design parameters of the source message conversation flow 220 (FIG. 2), according to embodiments. The reusable sub-message flow 270 (FIG. 2) is further invoked by the transform message flow program 260 (FIG. 2), for loading design parameters maintained in an XML file of the message conversion flow. Once invoked, the reusable sub-message flow 270 (FIG. 2) transmits the message conversion flow through a message transform computer, a second route transmission, for computing and verifying, the design parameters and, transmitting the design parameters to a second route message queue output, whereby the converted data of the design parameters of the message conversion flow are dynamically modified to form an input in a message flow queue in the target message broker systems environment 114B (FIG. 1).

For example, while invoking the reusable sub-message flow 270 (FIG. 2), the transform message flow program 260 (FIG. 2) may transmit through two input parameters, such as, a file name, or a message interface. The file name may be a complete path and name of external XML files of the design parameters. For example, the message interface may include a unique interface identifier for identifying which design parameters are designated to be loaded and, are whereby the design parameters are dynamically modified to form an input in a message flow queue of the target message broker. At step 330, the source message broker systems environment 114A (FIG. 1) transforms and converts the design parameters of the message conversion flow, in the reusable message flow 270 (FIG. 2), via a message flow order mechanism. At step 340, the source message broker systems environment 114A (FIG. 1) transmits the transformed and converted message conversion flow to the target message broker systems environment 114B (FIG. 1), via a target output message queue, according to embodiments.

Figure 4:
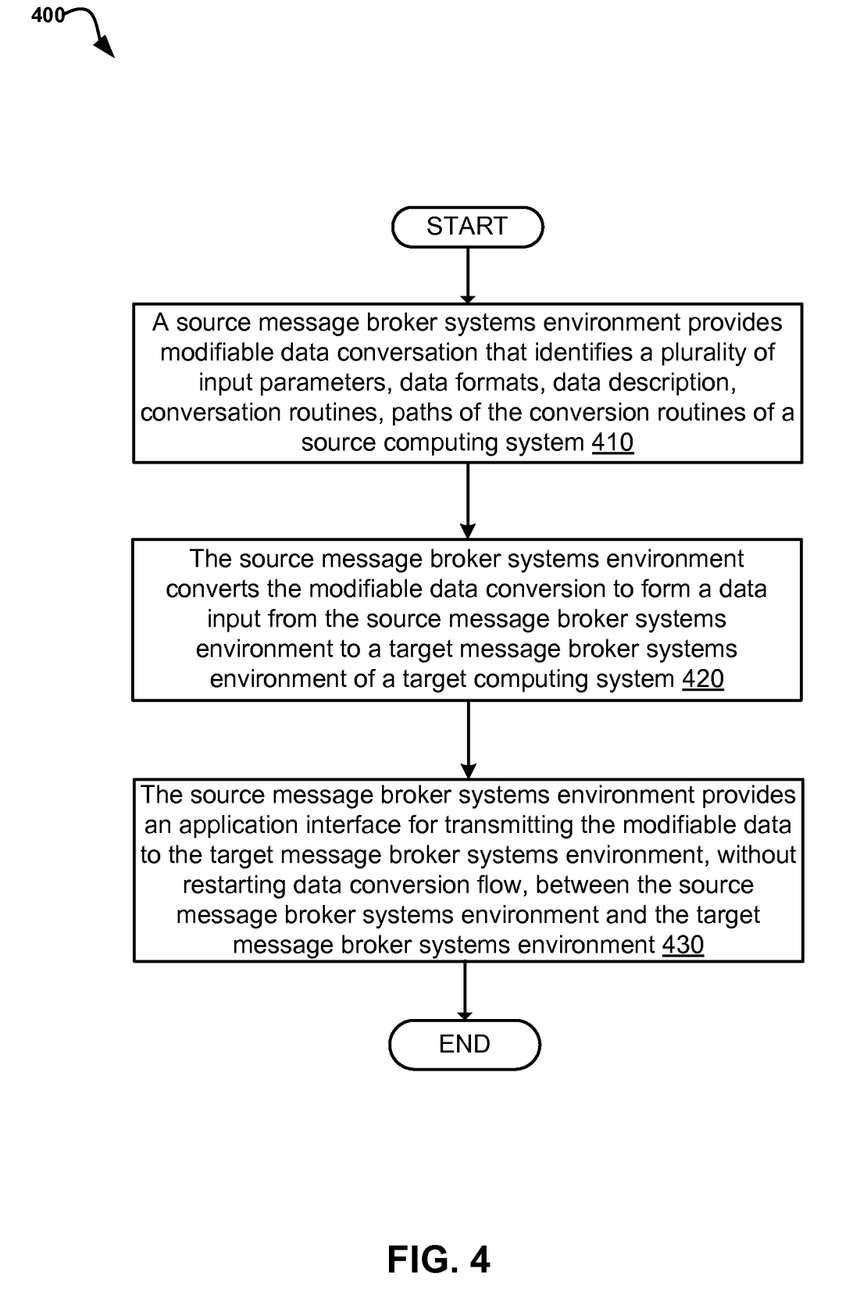
FIG. 4 illustrates an alternative operational flowchart illustrating the steps carried out by a program for modifying and deploying data conversion flow between a source system and a target system according to at least one embodiment.

FIG. 4 illustrates an alternative flow diagram 400 for modifying and deploying data conversion flow between the source computing system 102 (FIG. 1) and the target computing system 112 (FIG. 1), within the integrated data conversion environment 100 (FIG. 1), according to embodiments.

At step 410, the source message broker systems environment 114A (FIG. 1) provides modifiable data conversation that identifies a plurality of input parameters, data formats, data description, conversation routines, and paths of the conversion routines of the source computing system 102 (FIG. 1). At step 420, the source message broker systems environment 114A (FIG. 1) converts the modifiable data conversion to form a data input from the source message broker systems environment 114A (FIG. 1) to the target message broker systems environment 114B (FIG. 1). At step 430, the source message broker systems environment 114A (FIG. 1) provides a source application program interface 210 (FIG. 2) for transmitting the modifiable data to the target message broker systems environment 114B (FIG. 1), without restarting data conversion flow, between the source message broker systems environment 114A (FIG. 1) and the target message broker systems environment 114B (FIG. 1).

Figure 5:
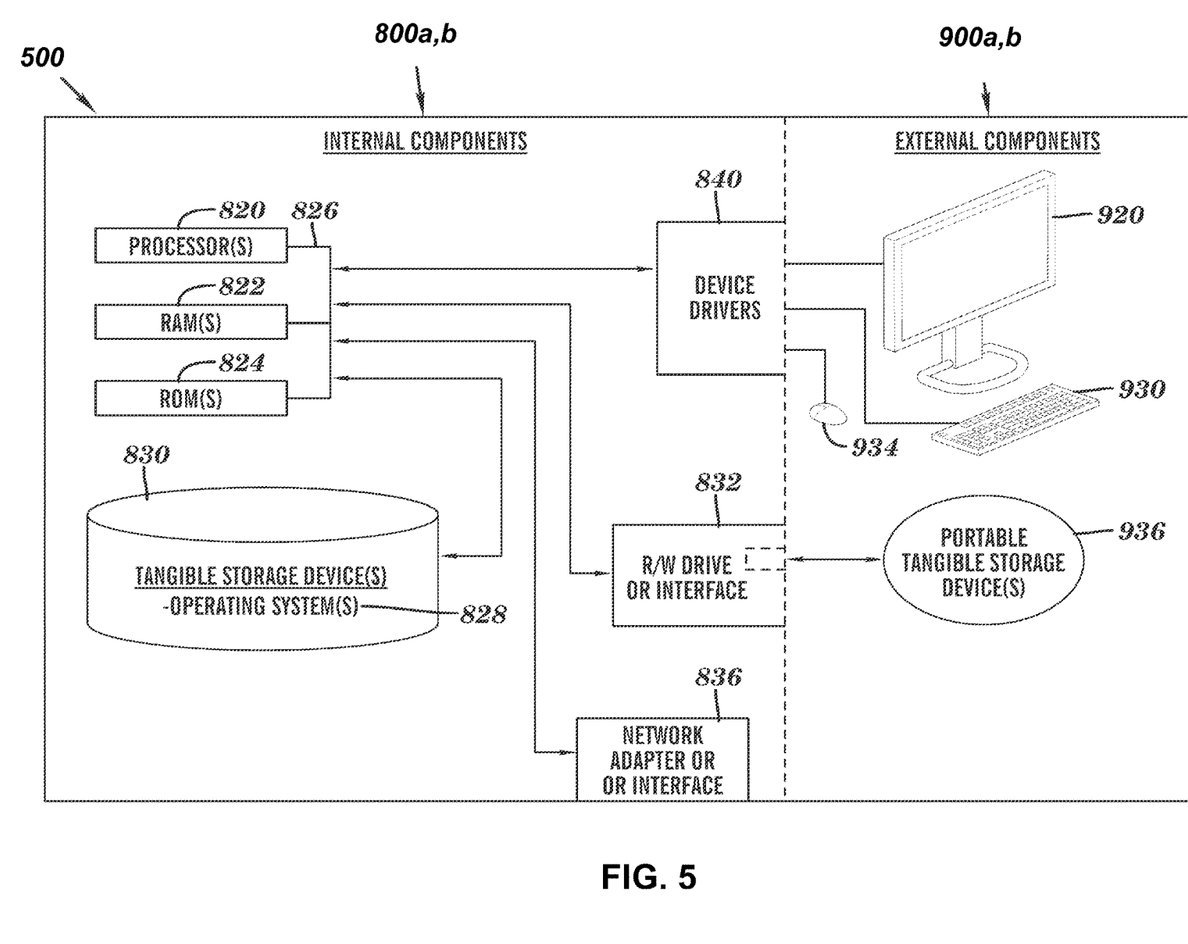
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Source computing system 102 (FIG. 1) and target computing system 112 (FIG. 1) may include respective sets of internal components 800a, b and external components 900a, b illustrated in FIG. 5. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in source computing system 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 5, each of the computer-readable tangible storage medium 830 is a magnetic disk storage device of an internal hard drive.

Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A source message broker systems environment 114A (FIG. 1) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and source message broker systems environment 114A (FIG. 1) in source computing system 102 (FIG. 1) and target message broker systems environment 114B (FIG. 1) in target computing system 112 (FIG. 1) can be downloaded to source computing system 102 (FIG. 1) and target computing system 112 (FIG. 1), respectively from an external computer via a network (for example, the Internet, a local area network or other, wide area network) and respective network adapters or interfaces 836. From the network adapters or interfaces 836, the software program 108 (FIG. 1) and source message broker systems environment 114A (FIG. 1) in source computing system 102 (FIG. 1) and target message broker systems environment 114B (FIG. 1) in target computing system 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
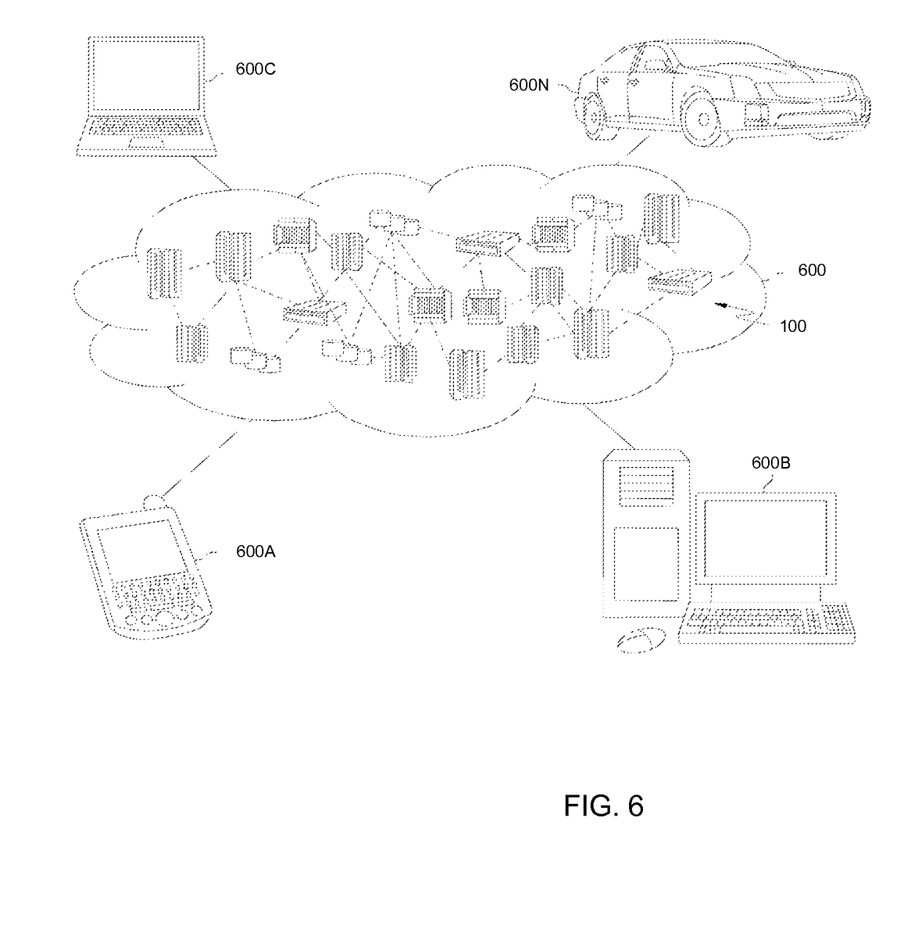
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
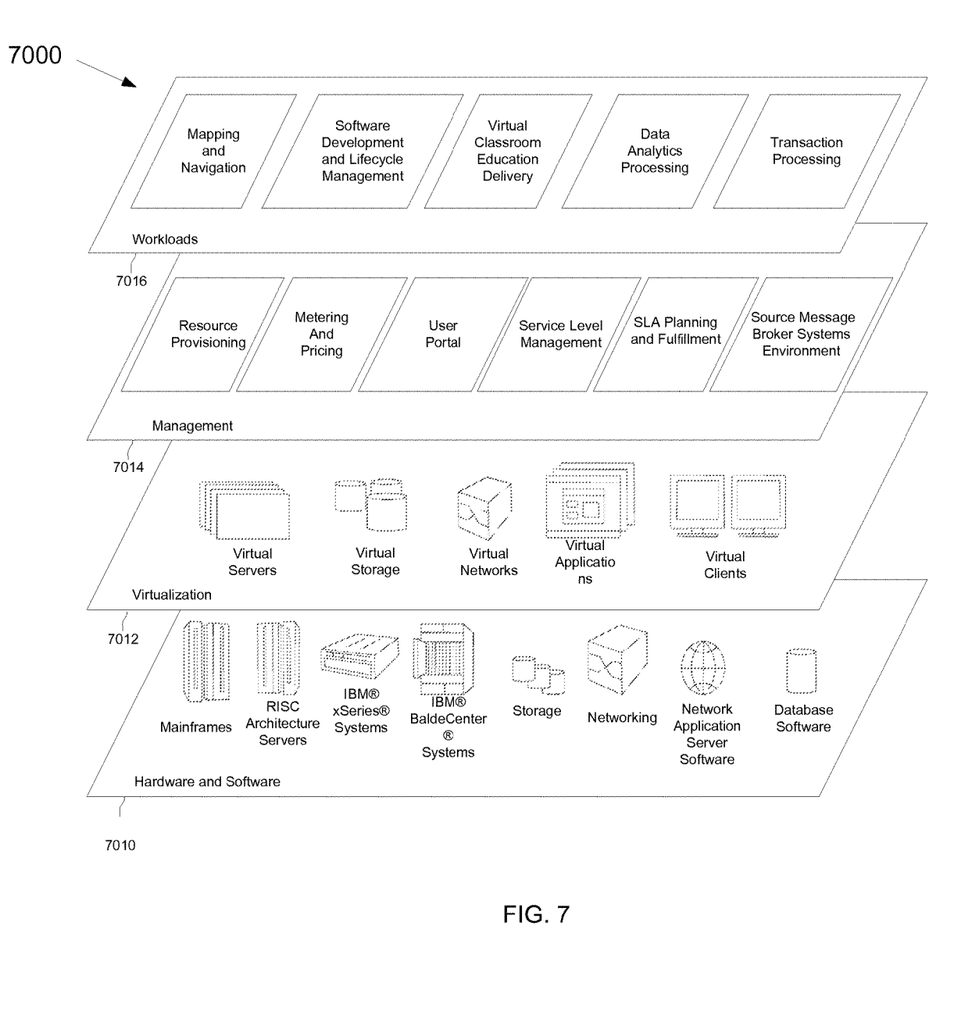
FIG. 7 is a block diagram of functional layers of the illustrative cloud computing environment of FIG. 6, in accordance with an embodiment of the present disclosure.

Referring now to FIG. 7, a set of functional abstraction layers 7000 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A source message broker systems environment may interact with a target broker systems environment for integrating modifying and deploying data conversion flow between a source system of the source message broker systems environment and a target system of the target message broker systems environment.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying and deploying a data conversion flow between a first application of a first message broker system and a second application of a second message broker system by dynamically loading a set of user-defined design parameters to alter the data conversion flow, without restarting the data conversion flow, the computer-implemented method comprising:

receiving a source message conversion flow from a source input message queue, wherein the conversion flow identifies a plurality of design parameters, wherein the plurality of design parameters includes a plurality of data format parameters, a plurality of data description parameters, a plurality of conversion routine parameters, a plurality of conversion routine path parameters, and a plurality of output routing information parameters;

identifying a message interface and a file path corresponding to the received message conversion flow;

accessing an external extensible markup language (XML) file based on the identified file path, wherein the external XML file contains a plurality of user-defined design parameters corresponding with at least one interface;

identifying the set of user-defined design parameters from the plurality of user-defined parameters based on matching the corresponding at least one interface with the identified message interface;

altering the plurality of design parameters based on the identified set of user-defined design parameters to form a target message conversion flow without changing the source message conversion flow; and sending the target message conversion flow including the altered plurality of design parameters to the second application to deploy the target message conversion flow.

2. The computer-implemented method of claim 1, wherein the the altered plurality of design parameters is used for the data conversion flow between the first application and the second application.

3. The computer-implemented method of claim 1, wherein the sending the received message conversion flow including the altered plurality of design parameters to the second application is performed within an enterprise systems environment.

4. A computer system for modifying and deploying a data conversion flow between a first application of a first message broker system and a second application of a second message broker system by dynamically loading a set of user-defined design parameters to alter the data conversion flow, without restarting the data conversion flow, the computer system comprising:

one or more processors, one or more computer-readable memories, one or more computer-readable tangible storage devices, and program instructions stored on one of the one or more storage devices for execution by at least one of the one or more processors via at least one of the one or more memories, the program instructions comprising:

program instructions to receive a source message conversion flow from a source input message queue, wherein the conversion flow identifies a plurality of design parameters, wherein the plurality of design parameters includes a plurality of data format parameters, a plurality of data description parameters, a plurality of conversion routine parameters, a plurality of conversion routine path parameters, and a plurality of output routing information parameters;

program instructions to identify a message interface and a file path corresponding to the received message conversion flow;

program instructions to access an external extensible markup language (XML) file based on the identified file path, wherein the external XML file contains a plurality of user-defined design parameters corresponding with at least one interface;

program instructions to identify the set of user-defined design parameters from the plurality of user-defined parameters based on matching the corresponding at least one interface with the identified message interface;

program instructions to alter the plurality of design parameters based on the identified set of user-defined design parameters to form a target message conversion flow without changing the source message conversion flow; and program instructions to send the target message conversion flow including the altered plurality of design parameters to the second application to deploy the target message conversion flow.

5. The computer system of claim 4, wherein the altered plurality of design parameters is used for the data conversion flow between the first application and the second application.

6. The computer system of claim 4, wherein the sending the received message conversion flow including the altered plurality of design parameters to the second application is performed within an enterprise systems environment.

7. A computer program product for modifying and deploying a data conversion flow between a first application of a first message broker system and a second application of a second message broker system by dynamically loading a set of user-defined design parameters to alter the data conversion flow, without restarting the data conversion flow, the computer system comprising:

one or more computer-readable tangible storage devices and program instructions stored on at least one of the one or more storage devices, the program instructions comprising:

program instructions to receive a source message conversion flow from a source input message queue, wherein the conversion flow identifies a plurality of design parameters, wherein the plurality of design parameters includes a plurality of data format parameters, a plurality of data description parameters, a plurality of conversion routine parameters, a plurality of conversion routine path parameters, and a plurality of output routing information parameters;

program instructions to identify a message interface and a file path corresponding to the received message conversion flow;

program instructions to access an external extensible markup language (XML) file based on the identified file path, wherein the external XML file contains a plurality of user-defined design parameters corresponding with at least one interface;

program instructions to identify the set of user-defined design parameters from the plurality of user-defined parameters based on matching the corresponding at least one interface with the identified message interface;

program instructions to alter the plurality of design parameters based on the identified set of user-defined design parameters to form a target message conversion flow without changing the source message conversion flow; and program instructions to send the target message conversion flow including the altered plurality of design parameters to the second application to deploy the target message conversion flow.

8. The computer program product of claim 7, wherein the altered plurality of design parameters is used for the data conversion flow between the first application and the second application.

* * * * *